(12) United States Patent
Kim et al.

(10) Patent No.: US 7,675,591 B2
(45) Date of Patent: Mar. 9, 2010

(54) TRANSFLECTIVE DISPLAY PANEL AND DISPLAY APPARATUS USING THE SAME

(75) Inventors: Jin-hwan Kim, Suwon-si (KR); Byoung-ho Cheong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 11/781,288

(22) Filed: Jul. 23, 2007

(65) Prior Publication Data

US 2008/0158486 A1 Jul. 3, 2008

(30) Foreign Application Priority Data

Dec. 29, 2006 (KR) .................. 10-2006-0138861

(51) Int. Cl.
G02F 1/1335 (2006.01)

(52) U.S. Cl. .................. 349/106; 349/114; 349/104

(58) Field of Classification Search .......... 349/104–114
See application file for complete search history.

(56) References Cited

U.S. PATENT DOCUMENTS

2004/0239850 A1* 12/2004 Kim ..................... 349/117

FOREIGN PATENT DOCUMENTS

| JP | 9-236703 A | 9/1997 |
|---|---|---|
| JP | 2002-318382 A | 10/2002 |
| WO | 02/06858 A2 | 1/2002 |

* cited by examiner

*Primary Examiner*—Kevin S Wood
(74) *Attorney, Agent, or Firm*—Sughrue Mion, PLLC

(57) ABSTRACT

A transflective display panel and a display apparatus using the same are provided. The display panel includes a plurality of pixels arranged in a matrix. Each of the pixels includes a plurality of subpixels, and each subpixel within a pixel outputs a different color of light. In addition, each of the subpixels includes a transflective mode region which has a reflection mode region with a diffraction grating and a transmission mode region; a liquid crystal layer which adjusts a transmittance of incident light through electric control; and a sub color filter which transmits light within a wavelength band of the incident light. Because the display panel includes the reflection mode region where the diffraction grating is formed, it can display a high-quality image with good white balance, even while outdoors or under bright illumination.

30 Claims, 15 Drawing Sheets

TRANSFLECTIVE DISPLAY PANEL AND DISPLAY APPARATUS USING THE SAME

CROSS-REFERENCE TO RELATED PATENT APPLICATION

This application claims priority from Korean Patent Application No. 10-2006-0138861, filed on Dec. 29, 2006 in the Korean Intellectual Property Office, the disclosure of which is incorporated herein in its entirety by reference.

BACKGROUND OF THE INVENTION

1. Field of the Invention

Apparatuses consistent with the present invention relate to a display panel and a display apparatus, and more particularly, to a display panel and a display apparatus which can obtain excellent visibility by enhancing white balance and out-coupling efficiency with respect to natural light or artificial light from the outside.

2. Description of the Related Art

With the rapid development of communication technologies and display apparatuses, various kinds of portable terminals have been introduced. Examples of portable terminals include personal digital assistants (PDAs), portable multimedia players (PMPs), and digital multimedia broadcasting (DMB) phones. Liquid crystal displays (LCDs) are a type of light-receiving flat panel display (FPD) used in portable terminals. Because LCDs are not self-luminous, they display an image by adjusting the transmittance of light emitted from a light source in each pixel. To this end, backlight units are installed in the rear surface of the LCDs to emit light toward liquid crystal panels.

Backlight units are classified into a direct light type backlight unit and an edge light type backlight unit, based on the arrangement of the light source. The direct light type backlight unit includes a plurality of lamps under the liquid crystal panel, and directly emits light toward the liquid crystal panel. The direct light type backlight unit is suitable for large-sized displays of 30 inches or more, such as LCD televisions (TVs), because the light sources can be freely and efficiently arranged in a wide area without restriction. On the other hand, the edge light type backlight unit is suitable for portable terminals because the light sources are arranged at limited locations, such as the edges of a light guide plate.

Meanwhile, portable terminals may be used in any location because of their portability, and may often be used outdoors in the sunlight. In this case, the visibility of the display may degrade, because the brightness of an LCD screen is relatively dark. Therefore, the advantage of the portable terminals in their ability to be used in any location cannot be sufficiently exploited.

In addition, when the LCD is used for a demonstration display, an outdoor billboard, or in a public place where illumination is present, high utilization of the LCD cannot be obtained if sufficient visibility is not secured.

To solve this problem, a display apparatus operating in both a reflection mode using external light and a transmission mode using a backlight unit has been developed. Such a display apparatus will be referred to as a transflective display apparatus.

FIG. 1 is a cross-sectional view of a related art transflective display apparatus. Referring to FIG. 1, the related art transflective display apparatus includes a light source 10, a light guide plate 15 which guides light emitted from the light source 10, and a liquid crystal layer 47 which adjusts the transmittance of the emitted light. FIG. 2 illustrates one pixel consisting of a blue subpixel B, a green subpixel G, and a red subpixel R. Each of the subpixels has a reflection mode region RM and a transmission mode region TM. The reflection mode region RM is defined by forming a scattering pattern 45 at a portion of the liquid crystal layer 47, and the transmission mode region TM is defined by a portion of the liquid crystal layer 47. A support film 43 is disposed under the scattering pattern 45. A color filter 50 is disposed above the liquid crystal layer 47, and a light hole h is formed in a portion of the color filter 50. The light hole h is formed at a predetermined portion above the scattering pattern 45.

In addition, a first linear polarization film 33, a first quarter wavelength plate 35, a first glass substrate 38, and a thin film transistor (TFT) film 40 are disposed between the light guide plate 15 and the liquid crystal layer 47. A plurality of films 20 are disposed between the light guide plate 15 and the first linear polarization film 33 to enhance light efficiency. The plurality of films 20 may include a diffusion sheet diffusing light, a prism sheet which corrects a light traveling path, and a brightness enhancement film (BEF) which enhances directionality by making the light passing through the prism sheet go directly toward the display panel.

The light Lb illuminated from the light guide plate 15 is incident onto a portion of the liquid crystal layer 47 corresponding to the transmission mode region TM. Then, the light Lb passes through the liquid crystal layer 47, while its transmittance is adjusted based on a voltage of the TFT layer 40. The color filter 50 transmits only a light color within a specific wavelength band. On the other hand, light incident from the light guide plate 15 toward the scattering pattern 45 does not contribute to image formation, because it is reflected. This produces degraded light efficiency; however, the degraded light efficiency is enhanced using external light Ls, so that the LCD can be used in a bright environment. Meanwhile, the external light Ls passes through the color filter 50, and only a light color within a specific wavelength band is transmitted to the scattering pattern 45. The light reflected from the scattering pattern 45 passes through the color filter 50 and is outputted to the outside, thus forming an image. Because the color filter 50 is designed to be optimal for the transmission mode region where a white light emitting diode (LED) is used, color reproduction in the sunlight or external illumination light will be degraded. Furthermore, when the reflection mode is implemented using the external light, the light passes through the color filter 50 two times, resulting in degradation of the light efficiency. To solve this problem, the light hole h is formed in the color filter 50, such that the light is directly incident onto the scattering pattern 45 without passing through the color filter 50. In this way, color reproduction is improved and white balance is adjusted.

FIG. 3A is a graph illustrating color coordinates of light passing through the transmission mode region and light reflected from the reflection mode region. FIG. 3B is a graph illustrating variation of color coordinates for different diameters of the light hole h. It can be seen from FIGS. 3A and 3B that the color coordinate in the reflection mode is similar to the color coordinate in the transmission mode. That is, the color reproduction is enhanced by the light hole.

However, because the scattering pattern 45 scatters and reflects the incident light, the direction of the reflected light is uncontrolled and scattered. Therefore, an amount of light condensed at a user's viewing angle is so small that brightness is low. Although the white balance can be adjusted by varying the size of the light hole h in red, green and blue pixels, increasing the front brightness with high reflection is limited.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a display panel and a display apparatus using the same, which can provide high-brightness color reproduction by enhancing reflection brightness and adjusting white balance.

According to an exemplary embodiment of the present invention, there is provided a display panel including a plurality of pixels arranged in a matrix, in which each pixel includes a plurality of subpixels which output light of different colors, and each subpixel includes a transflective mode region which has a reflection mode region with a diffraction grating and a transmission mode region; a liquid crystal layer which adjusts a transmittance of incident light through electric control; and a sub color filter which transmits light within a wavelength band of the incident light.

The diffraction grating may be formed in the same pattern in each subpixel.

The diffraction grating of a subpixel may be formed in a pattern based on the transmittance of the sub color filter of the subpixel.

The diffraction grating of the subpixel may include patterns which provide a constant out-coupling efficiency, which is defined as the product of the transmittance of the sub color filter and the diffraction efficiency of the diffraction grating.

The out-coupling efficiency may be determined for the sub color filter which has the lowest transmittance.

The diffraction grating may include a reflection type diffraction grating.

The reflection mode region may include a transmission type diffraction grating disposed at a portion of the sub color filter; and a reflection layer disposed at a lower portion of the liquid crystal layer.

The display panel may also include an incident angle adjustment film disposed above the diffraction grating and having a different refractive index from a refractive index of the liquid crystal layer.

The diffraction grating may be partitioned into a plurality of regions, and grating patterns may be arranged in the plurality of regions in different directions.

According to another exemplary embodiment of the present invention, there is provided a display panel including a plurality of pixels arranged in a matrix, in which each pixel includes a plurality of subpixels which output light of different colors, and each of the subpixels includes a transflective mode region which has a reflection mode region and a transmission mode region; a liquid crystal layer disposed above the transflective mode region which adjusts a transmittance of incident light through electric control; and a sub color filter which transmits light within a wavelength band of the incident light. The reflection mode region includes a reflection layer disposed under the liquid crystal layer; and an incident angle adjustment array which has a plurality of incident angle adjustment cells arranged at constant intervals, in which the incident angle adjustment cells have a different refractive index from a refractive index of the liquid crystal layer.

According to another exemplary embodiment of the present invention, there is provided a display apparatus including a backlight unit which emits light; and a display panel disposed above the backlight unit, in which the display panel includes a plurality of pixels arranged in a matrix, each pixel includes a plurality of subpixels which output light of different colors, and each subpixel includes a transflective mode region which has a reflection mode region with a diffraction grating and a transmission mode region; a liquid crystal layer which adjusts a transmittance of incident light through electric control; and a sub color filter which transmits light of a wavelength band of the incident light. Light emitted from the backlight unit passes through the transmission mode region to form an image, and light incident from the outside is reflected from the reflection mode region to form an image.

According to another exemplary embodiment of the present invention, there is provided a display apparatus including a backlight unit which emits light; and a display panel disposed above the backlight unit, in which the display panel includes a plurality of pixels arranged in a matrix, each pixel includes a plurality of subpixels which output light of different colors, and each subpixel includes a transflective mode region which has a reflection mode region and a transmission mode region; a liquid crystal layer disposed above the transflective mode region which adjusts a transmittance of incident light through electric control; and a sub color filter which transmits light within a wavelength band of the incident light. The reflection mode region includes a reflection layer disposed under the liquid crystal layer; and an incident angle adjustment array disposed between the liquid crystal layer and the reflection layer, and having a plurality of incident angle adjustment cells arranged at constant intervals, in which the incident angle adjustment cells have a different refractive index from the refractive index of the liquid crystal layer.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 4:
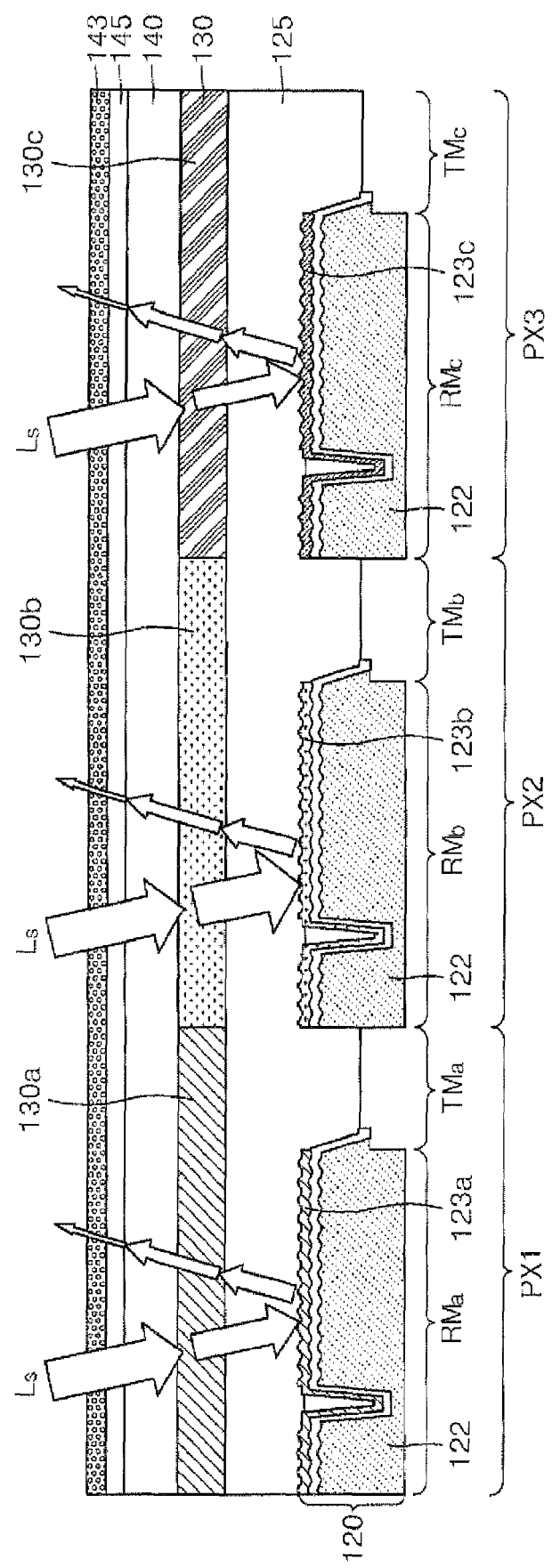
FIG. 4 is a cross-sectional view of a transflective display panel according to an exemplary embodiment of the present invention.

FIG. 4 is a cross-sectional view of one pixel having a plurality of subpixels emitting light of different colors. The pixel includes a first subpixel PX1, a second subpixel PX2, and a third subpixel PX3. The first to third subpixels PX1, PX2 and PX3 are arranged in a matrix form. A transflective display panel according to an exemplary embodiment of the present invention includes a transflective mode region 120 having reflection mode regions RMa, RMb and RMc and transmission mode regions TMa, TMb and TMc in the subpixels PX1, PX2 and PX3, respectively. The reflection mode regions RMa, RMb and RMc include diffraction gratings 123a, 123b and 123c, respectively. A reflection mode is implemented in the reflection mode regions RMa, RMb and RMc to form an image using an external light Ls, and a transmission mode is implemented in the transmission mode regions TMa, TMb and TMc to form an image using light emitted from a light source of a display apparatus.

Specifically, FIG. 4 is a cross-sectional view of a transflective display panel according to an exemplary embodiment of the present invention. Referring to FIG. 4, the subpixels include the transflective mode region 120 having the reflection mode regions RMa, RMb and RMc and the transmission mode regions TMa, TMb and TMc, a liquid crystal layer 125 disposed on the transflective mode region 120, and sub color filters 130a, 130b and 130c which transmit light within a wavelength band of the incident light. The reflection mode regions RMa, RMb and RMc have the diffraction gratings 123a, 123b and 123c at predetermined portions of the subpixels PX1, PX2 and PX3, respectively. The remaining regions where no diffraction gratings are formed are defined as the transmission mode regions TMa, TMb and TMc. Since the diffraction gratings 123a, 123b and 123c are formed as reflection type gratings, the external light Ls is reflected to the outside in the reflection mode regions RMa, RMb and RMc. The transmission mode regions TMa, TMb and TMc extend from the liquid crystal layer 125 and transmit light.

A support film 122 is formed under the diffraction gratings to support them. A glass substrate 140, a quarter wavelength plate 145, and a linear polarization film 143 are sequentially disposed above the color filter layer 130. A TFT layer, a glass substrate, a quarter wavelength plate, and a linear polarization film, which are symmetrical to the films disposed above the color filter layer 130, are sequentially disposed under the transflective mode region 120. This will be described later in more detail.

The liquid crystal layer 125 controls the transmittance of the incident light through electrical control of the TFT layer. The color filter layer 130 is disposed on the liquid crystal layer 125 and has the sub color filters 130a, 130b and 130c corresponding to the respective subpixels. The plurality of subpixels may include the first to third subpixels PX1, PX2 and PX3, and the first to third sub color filters 130a, 130b and 130c may be arranged to face the first to third subpixels PX1, PX2 and PX3, respectively. The first sub color filter 130a, the second sub color filter 130b, and the third sub color filter 130c transmit red light, green light, and blue light, respectively.

In the transflective mode region 120, the first subpixel PX1 includes the first reflection mode region RMa where the first diffraction grating 123a is formed, and the first transmission mode region TMa where the liquid crystal is formed. The second subpixel PX2 includes the second reflection mode region RMb where the second diffraction grating 123b is formed, and the second transmission mode region TMb where the liquid crystal is formed. The third subpixel PX3 includes the third reflection mode region RMc where the third diffraction grating 123c is formed, and the third transmission mode region TMc where the liquid crystal is formed. The first to third diffraction gratings 123a, 123b and 123c may be formed to have the same patterns. Diffraction occurs when the external light Ls passes through the color filter layer 130 and is reflected from a diffraction grating. An image having a high-efficiency white balance can be formed using the diffracted light having a high diffraction efficiency and a small diffraction angle.

Meanwhile, the first to third diffraction gratings 123a, 123b and 123c may be formed to have different patterns. Generally, the color filter has different transmittance based on the transmission wavelength bands. However, the incorrect adjustment of the white balance does not occur, because an image is formed using a different amount of light based on the transmission wavelength band. The white balance is adjusted by controlling the out-coupling efficiency of the first to third subpixels. The out-coupling efficiency can be controlled using the transmittance of the color filters and the diffraction efficiency of the diffraction gratings. Assuming that the transmittances of the first to third sub color filters 130a, 130b and 130c are $T_R$, $T_G$ and $T_B$, respectively, and the diffraction efficiencies of the first to third diffraction gratings are $\eta(R)$, $\eta(G)$ and $\eta(B)$, respectively, the white balance can be adjusted when the out-coupling efficiency, defined by product of the transmittance and the diffraction efficiency, satisfies Equation (1) below.

$$T_R\eta(R)=T_G\eta(G)=T_B\eta(B) \qquad (1)$$

In order to adjust the white balance, the out-coupling efficiency is controlled by modifying the patterns of the first to third diffraction gratings 123a, 123b and 123c. For example, when the transmittances of the first to third sub color filters 130a, 130b and 130c satisfy the relationship $T_R > T_G > T_B$, the diffraction efficiencies are adjusted to satisfy the relationship of $\eta(R) > \eta(G) > \eta(B)$.

A method for determining the patterns of the diffraction gratings for obtaining the constant out-coupling efficiency of the first to third subpixels will now be described in detail.

Figure 5:
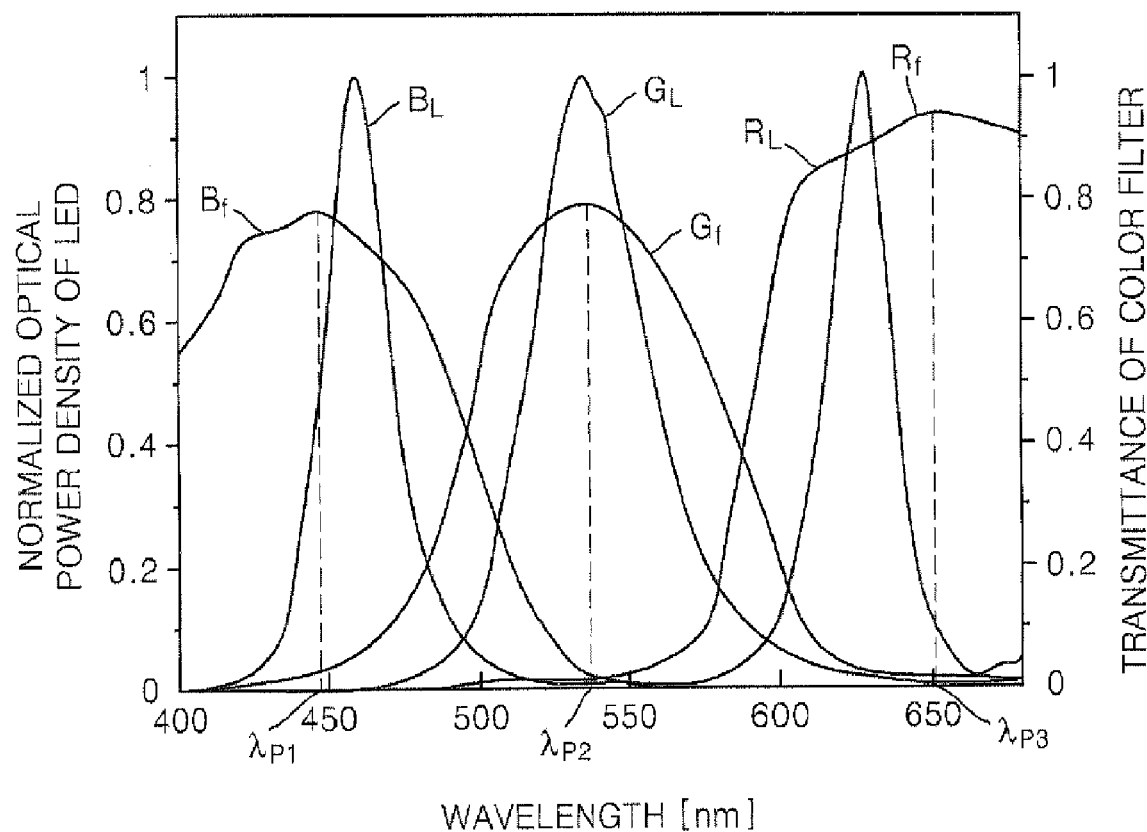
FIG. 5 is a graph illustrating transmittances and normalized optical power densities of LEDs for wavelengths of the light passing through the color filters in the transflective display panel of FIG. 4.

FIG. 5 is a graph illustrating the transmittances of the first to third sub color filters 123a, 123b and 123c. The transmittances $T_R$, $T_G$ and $T_B$ of the first to third sub color filters are 33%, 27% and 26%, respectively. First to third peak wavelengths $\lambda_{P1}$, $\lambda_{P2}$ and $\lambda P_3$ of the first to third color light $R_f$, $G_f$ and $B_f$ passing through the first to third sub color filters 123a, 123b and 123c are 450 nm, 540 nm and 650 nm, respectively, and their bandwidth is 100 nm. In FIG. 5, $R_L$, $G_L$ and $B_L$ represent normalized optical power densities of the red LED, the green LED, and the blue LED, respectively.

Figure 6:
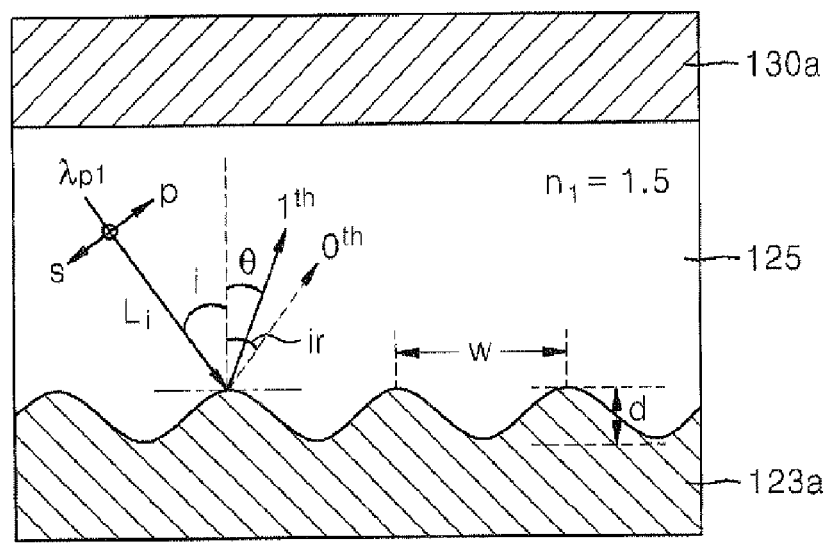
FIG. 6 is a cross-sectional view of a reflection mode region of the transflective display panel of FIG. 4.

FIG. 6 is a cross-sectional view of the first diffraction grating 123a of the first subpixel PX1. An operation of the diffraction grating will now be described with reference to FIG. 6. When the external light passes through the first sub color filter 130a, light having the first peak wavelength $\lambda_{P1}$ is transmitted through the first sub color filter 130a and is incident onto the first diffraction grating 123a. In FIG. 6, reference symbols s and p represent s-polarized light and p-polarized light, respectively. Light having the first peak wavelength $\lambda_{P1}$ is diffracted and reflected as $0^{th}$ order light and $\pm 1^{st}$ order light in the first diffraction grating 123a. The $0^{th}$ order light is reflected at a reflection angle (ir) equal to an incident angle (i) of the incident light (Li), in accordance with the reflection law. The $-1^{st}$ order light is reflected at a diffraction angle ($\theta$), which is less than the incident angle (i). The incident angle (i), the reflection angle (ir), and the diffraction angle ($\theta$) are measured with respect to a line normal to the plane of the incident light. Generally, vertical light emission increases when the diffraction angle is small, and high-efficiency light can be obtained when the diffraction efficiency of low-order light with a small diffraction angle is high. Therefore, when the vertical light emission increases, the amount of light emitted toward the front of the display panel increases, and the user can view a clear image. For this reason, the $-1^{st}$ order light with a small diffraction angle is used as effective light.

Figure 7:
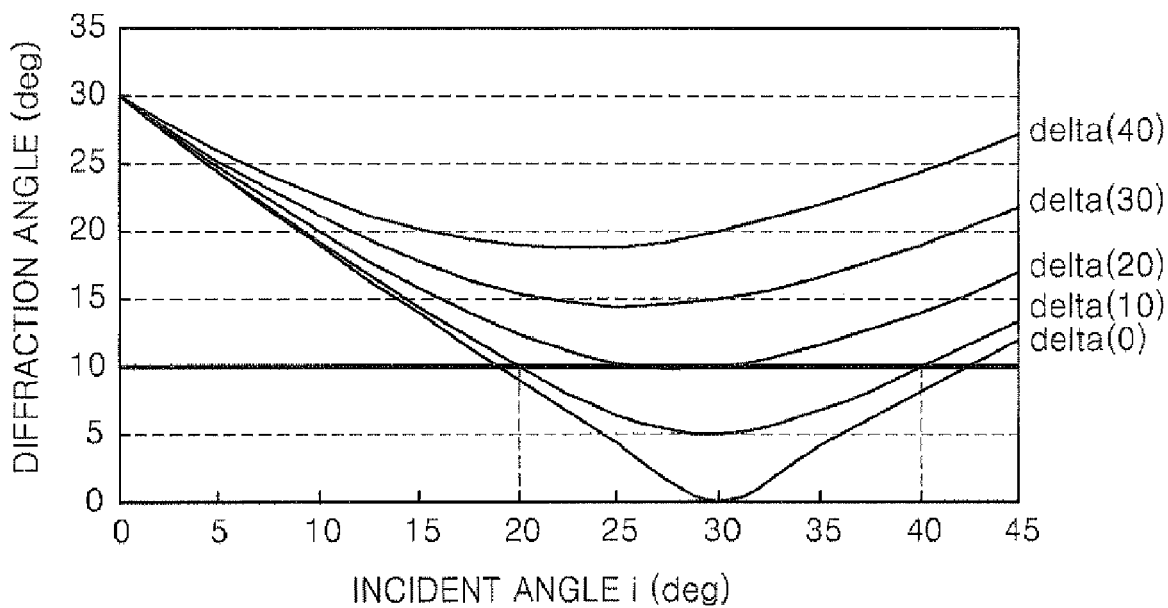
FIG. 7 is a graph illustrating the variation of the diffraction angle with respect to the incident angle at each azimuth angle (delta) for diffraction grating patterns when light is incident onto and reflected from the diffraction grating in the transflective display panel of FIG. 4.
Figure 15A:
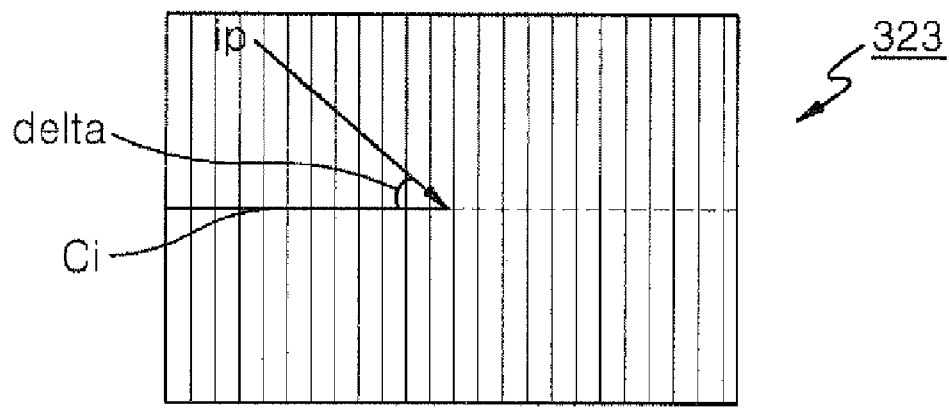
FIGS. 15A through 15D illustrate diffraction gratings of the transflective display panel according to exemplary embodiments of the present invention.

The diffraction angle changes according to the pitch (w) of the diffraction grating pattern, and the diffraction efficiency changes according to the depth and shape of the diffraction grating pattern. FIG. 7 is a graph illustrating the variation of the diffraction angle ($\theta$) of the $-1^{st}$ order light with respect to the incident angle (i) at each azimuth angle (delta) of the incident light. As illustrated in FIG. 15A, the azimuth angle of the incident angle represents an angle (delta) of light (ip), which is measured with respect to a vertical line (ci) of the diffraction grating pattern when the incident light is projected on the diffraction grating plane. Reflection occurring when the incident angle is 30° is called a spot reflection. The pattern pitch of the diffraction grating making the exit diffraction angle 0° at the incident angle of 30° is calculated. Referring to FIG. 7, the diffraction angle is 0° when the azimuth angle is 0° and the incident angle is 30°. The pattern pitch of the diffraction grating satisfying this condition can be calculated using a diffraction grating equation. Equation (2) below is a grating equation showing the value of an x component of a wave vector of the diffracted light to calculate the diffraction angle of the diffraction grating.

$$k'_x = k_x + \frac{2\pi h}{w} \qquad (2)$$

In this equation $k_x'$ is the x component of the wave vector of the diffracted light, $k_x$ is the x component of the wave vector of the incident light, h is the diffraction order, and w is the pattern pitch of the diffraction grating.

Using the grating equation, the pitch (w) of the diffraction grating pattern is set based on the equation $w/\lambda_P = 1.33$.

Meanwhile, as the azimuth angle of the incident light increases, the diffraction angle with respect to the incident light (i) of the $-1^{st}$ order light tends to increase. When seeing the light passing through the color filter at the front, the user can observe light having a diffraction angle in the range of about 0-10°. Referring to FIG. 7, when the light having an azimuth angle of 0° and the light having an azimuth angle of 10° are incident between the angles of 20-40°, the light is reflected with the diffraction angle distribution of about 0-10°.

Figure 8A:
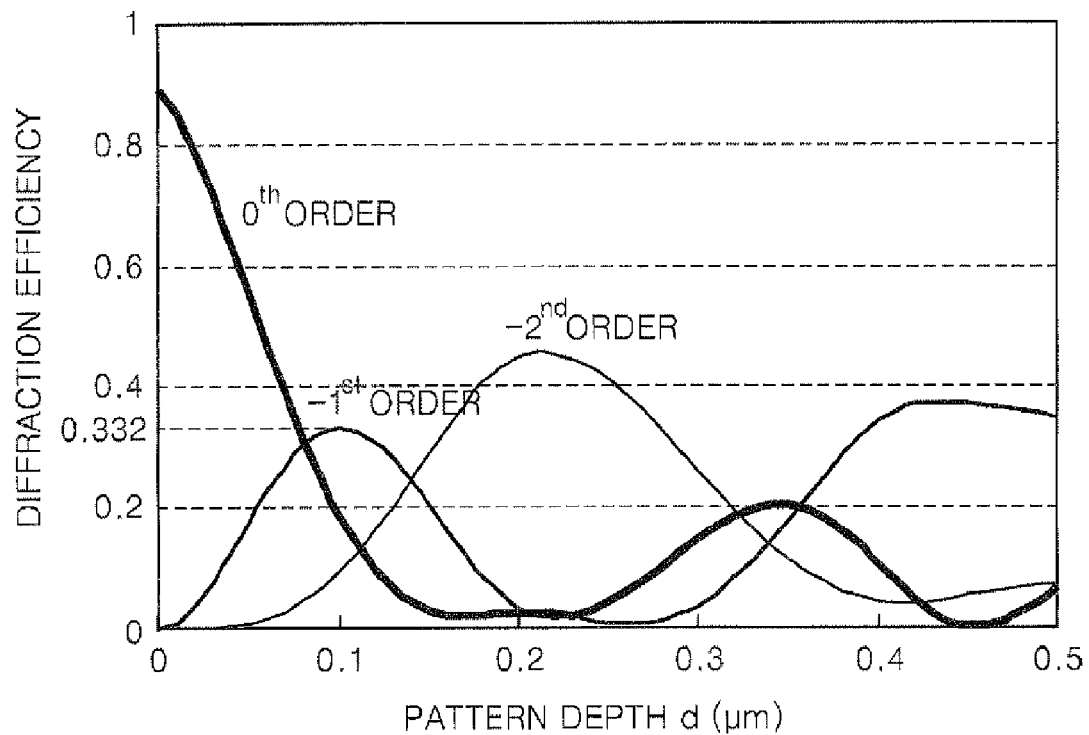
FIG. 8A is a graph illustrating the variation of the diffraction efficiency with respect to the pattern depth of the diffraction grating for blue light in the transflective display panel of FIG. 4.

After determining the pattern pitch (w) of the diffraction grating, the pattern depth (d) of the diffraction grating is determined. A depth where the diffraction efficiency is high is determined as the pattern depth (d) of the diffraction grating. A depth of the pattern having a high diffraction efficiency is first calculated with respect to the wavelength where the transmittance is lowest among the peak wavelengths of 450 nm, 540 nm and 650 nm. In this way, the wavelength where the transmittance is low can be compensated for by adjusting the diffraction efficiency. In this case, since the light having the wavelength of 450 nm has the lowest transmittance, the depth of the diffraction grating is calculated where the $-1^{st}$ order diffraction efficiency of pattern for the light having the wavelength of 450 nm becomes maximal. FIG. 8A is a graph illustrating the variation of the diffraction efficiency with respect to the light having the peak wavelength of 450 nm with the pattern depth (d) of the diffraction grating. Referring to FIG. 8A, the maximum diffraction efficiency of the $-1^{st}$ order light is 0.332.

Figure 8B:
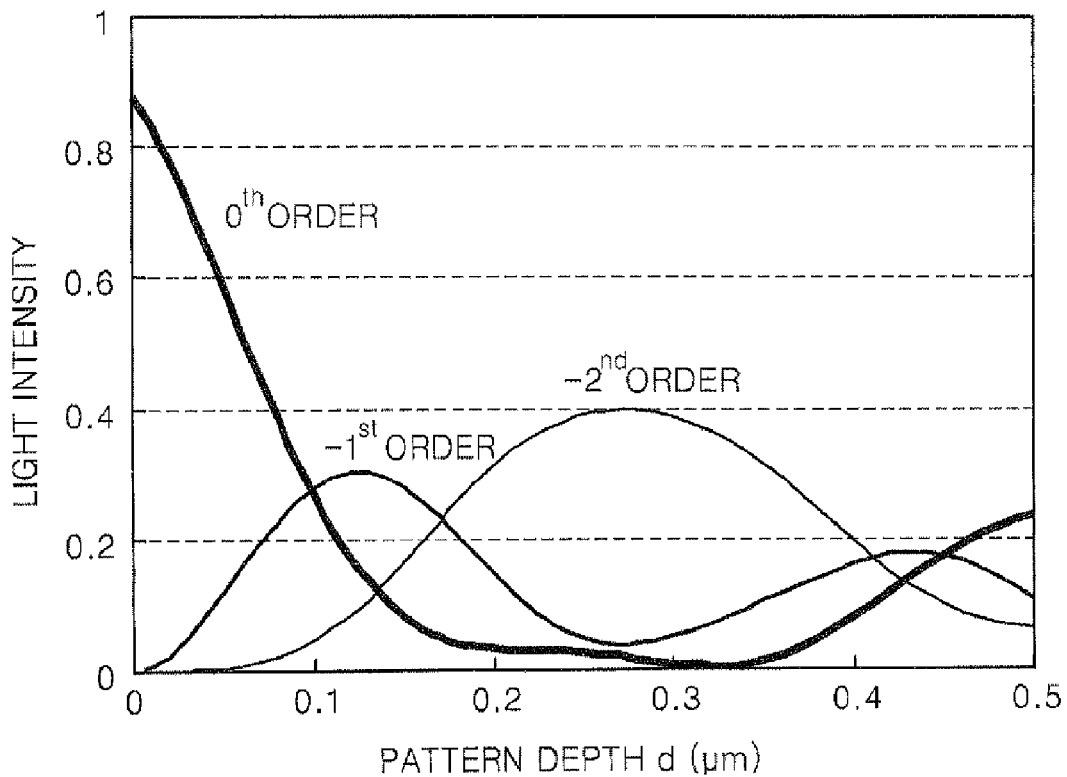
FIG. 8B is a graph illustrating the variation of the diffraction efficiency with respect to the pattern depth of the diffraction grating for green light in the transflective display panel of FIG. 4.
Figure 8C:
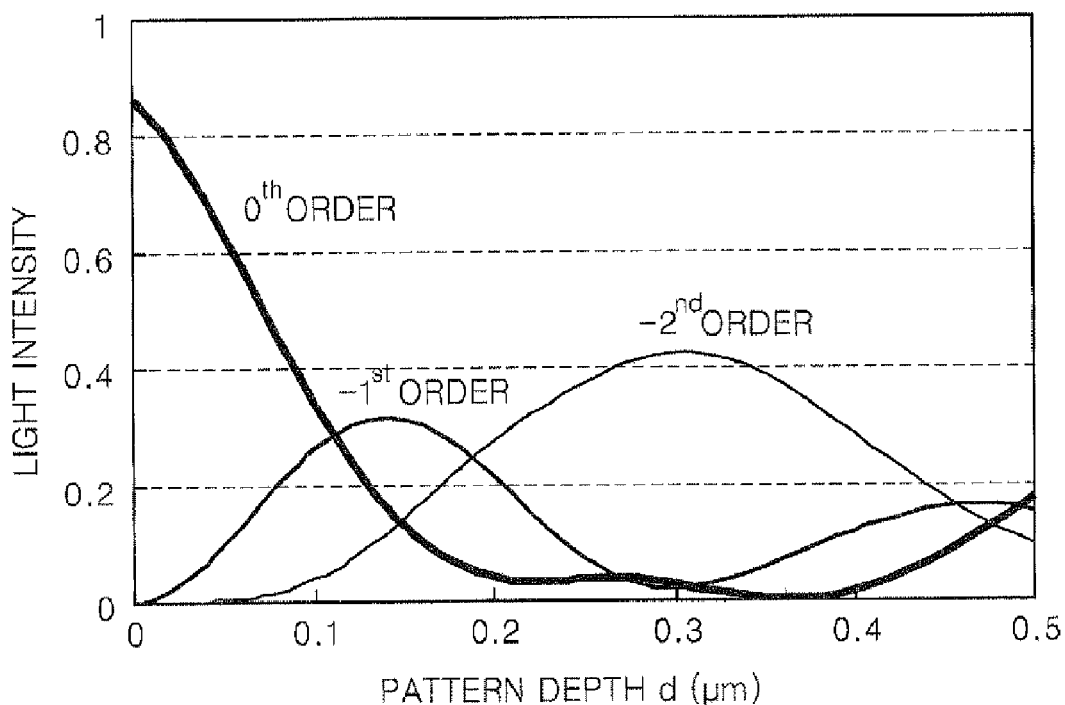
FIG. 8C is a graph illustrating the variation of the diffraction efficiency with respect to the pattern depth of the diffraction grating for red light in the transflective display panel of FIG. 4.

FIG. 8B is a graph illustrating the variation of the diffraction efficiency with respect to the light having the peak wavelength of 550 nm with the pattern depth (d) of the diffraction grating. FIG. 8C is a graph illustrating the variation of the diffraction efficiency with respect to the light having the peak wavelength of 650 nm with the pattern depth (d) of the diffraction grating.

The depth of the diffraction pattern having the peak wavelength of 550 nm and the depth of the diffraction pattern having the peak wavelength of 650 nm are calculated by considering the white balance. The white balance can be adjusted by controlling the out-coupling efficiency, which is defined as the product of the transmittance of the sub color filter and the diffraction efficiency. More specifically, the out-coupling efficiency is determined by the product of the diffraction efficiency of the light incident within a diffraction angle of ±10° and the transmittance of the sub color filter. In the case of the blue color filter, the $-1^{st}$ order diffraction efficiency is 0.332 and the transmittance is 0.26. Thus, the out-coupling efficiency of the blue color filter is 8.65% (=0.332×0.026×100).

Figure 9:
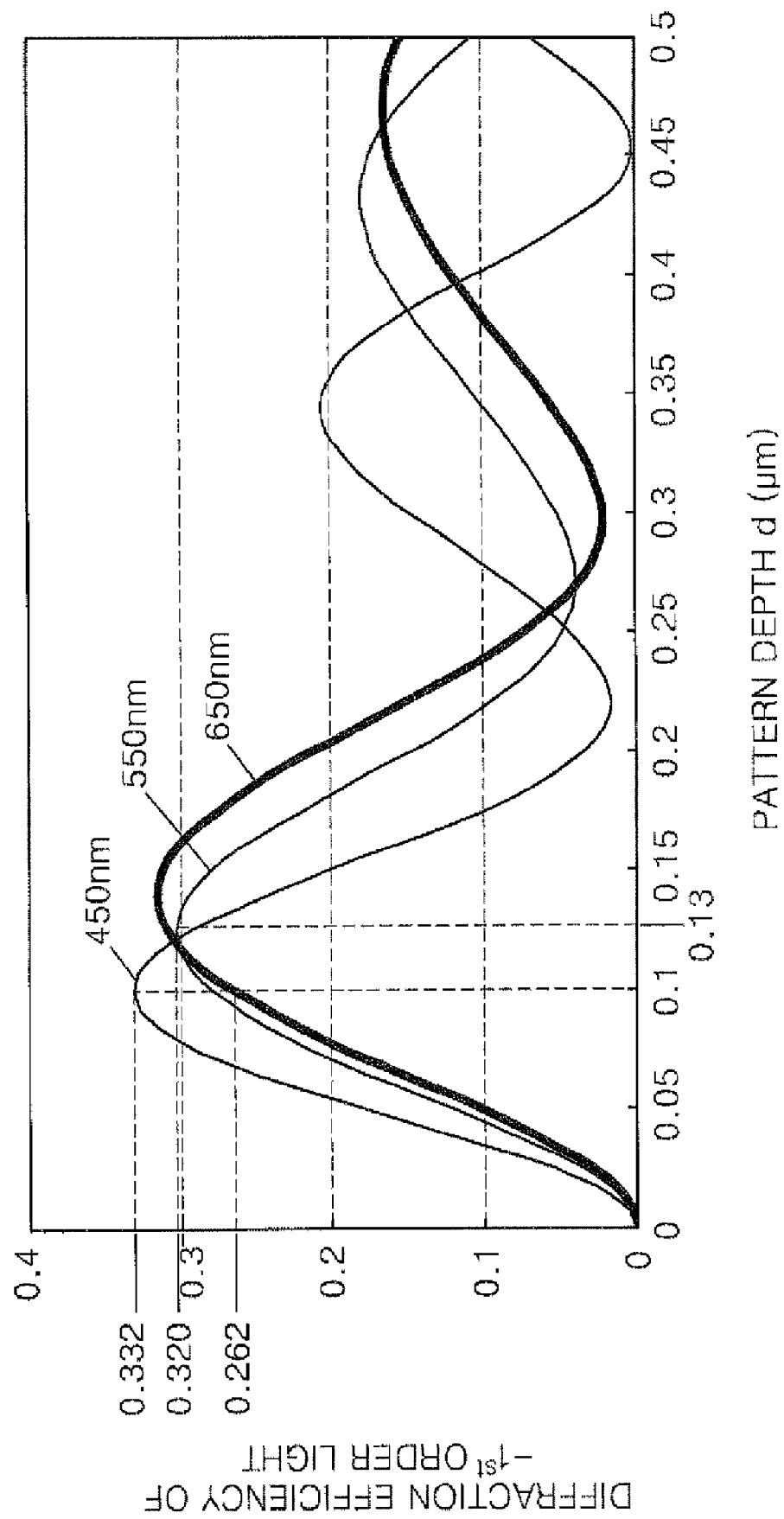
FIG. 9 is a graph illustrating diffraction efficiencies of $-1^{st}$ order light with respect to the pattern depth of the diffraction gratings disposed in each subpixel of the transflective display panel of FIG. 4.

In order to adjust the white balance, the out-coupling efficiencies of the green sub color filter and the red sub color filter are adjusted to be 8.65% to match the out-coupling efficiency of the blue sub color filter. When the transmittance of the green sub color filter is 27%, the $-1^{st}$ order diffraction efficiency must be 0.320 to obtain the out-coupling efficiency of 8.65%. When the transmittance of the red sub color filter is 33%, the $-1^{st}$ order diffraction efficiency must be 0.262. FIG. 9 is a graph illustrating how the diffraction efficiencies of the $-1^{st}$ order light vary with the pattern depth at the wavelengths shown in FIGS. 8A through 8C. Referring to FIG. 9, the depth (d) of the diffraction grating for the blue color is set to 100 nm in order to obtain the $-1^{st}$ order diffraction efficiency of 0.332. The pattern depth (d) of the diffraction grating for the green color is set to 130 nm in order to obtain the $-1^{st}$ order diffraction efficiency of 0.320. The pattern depth (d) of the diffraction grating for the red color is set to 100 nm in order to obtain the $-1^{st}$ order diffraction efficiency of 0.262.

Therefore, the first diffraction grating is designed to have the pattern with the pitch (w) of 824 nm and the depth of 100 nm. The second diffraction grating is designed to have the pattern with the pitch (w) of 731 nm and the depth of 130 nm. The third diffraction grating is designed to have the pattern with the pitch (w) of 598 nm and the depth of 100 nm. In this way, the out-coupling efficiencies of each color are adjusted to be equal, and the correct white balance can be achieved.

An operation in the reflection mode region having the reflection type diffraction grating will now be described. When the external light passes through the color filter, the light of a predetermined wavelength passes through the liquid crystal layer 125 and is incident on the diffraction grating. The light is reflected from the diffraction grating based on the specific diffraction efficiency and the diffraction angle determined by the designed pattern. The transmittance of the liquid crystal layer 125 is adjusted by electrically controlling the TFT layer, which will be described later. A color image is displayed by forming colors based on image signals in each pixel. In this case, when the light is reflected from the diffraction grating, high-efficiency light is reflected within a diffraction angle of less than 10°. Therefore, the user can view the image clearly, even under bright illumination or sunlight.

Figure 1:
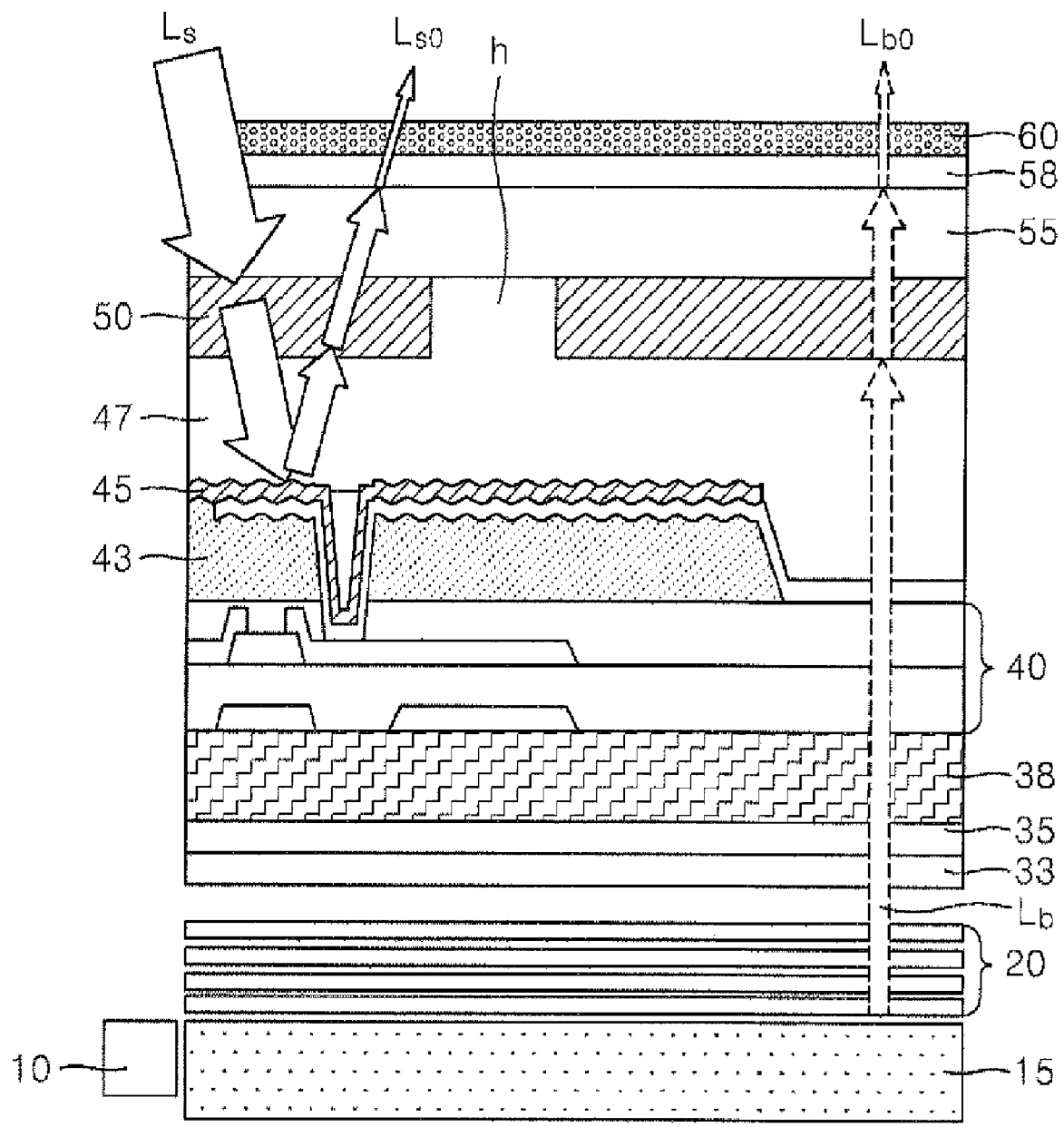
FIG. 1 is a cross-sectional view of a related art transflective display apparatus.
Figure 2:
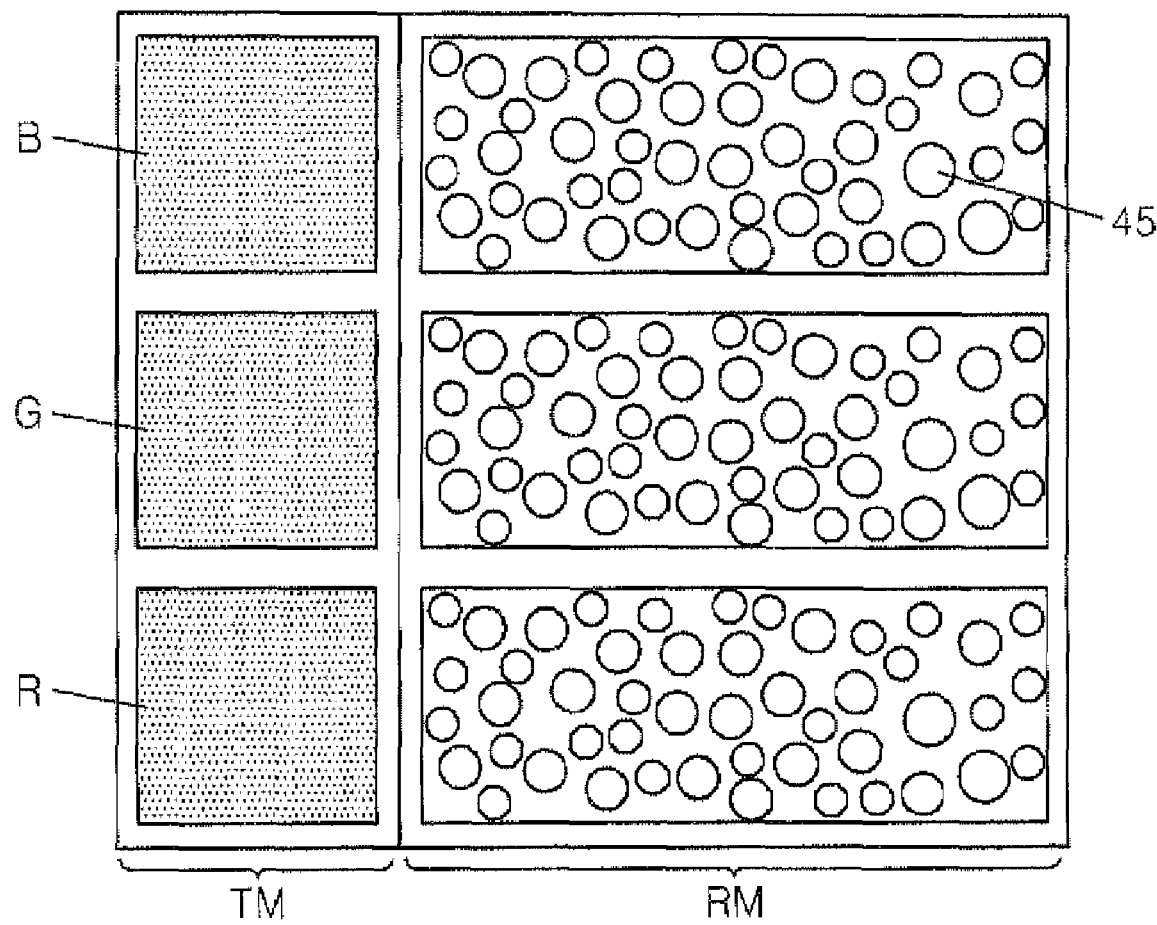
FIG. 2 illustrates one pixel consisting of a blue subpixel, a green subpixel, and a red subpixel.
Figure 3A:
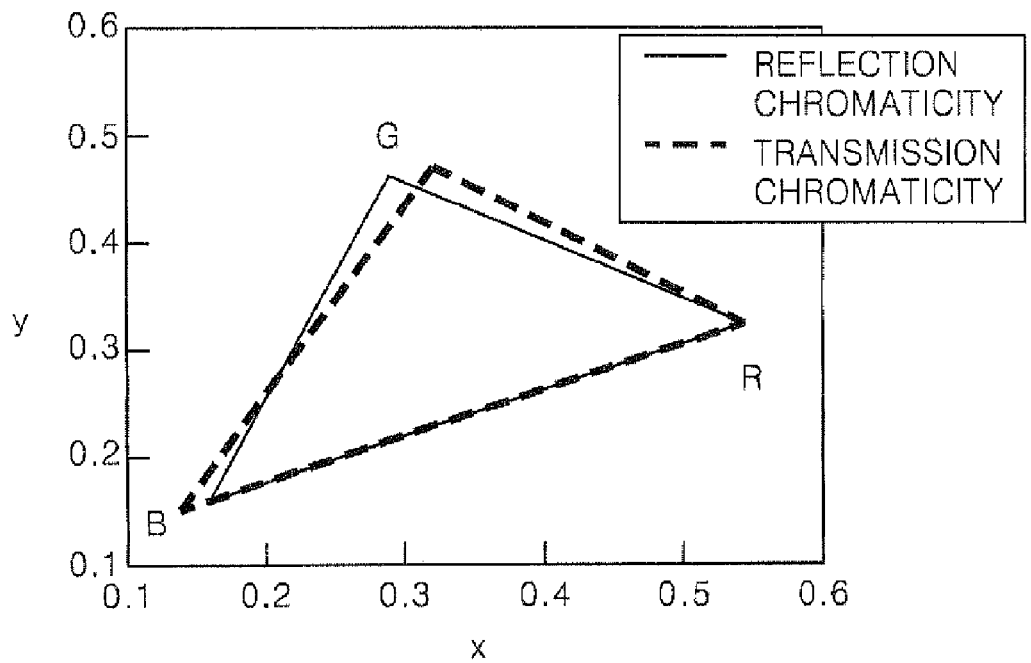
FIG. 3A is a graph illustrating color coordinates of the display apparatus of FIG. 1.
Figure 3B:
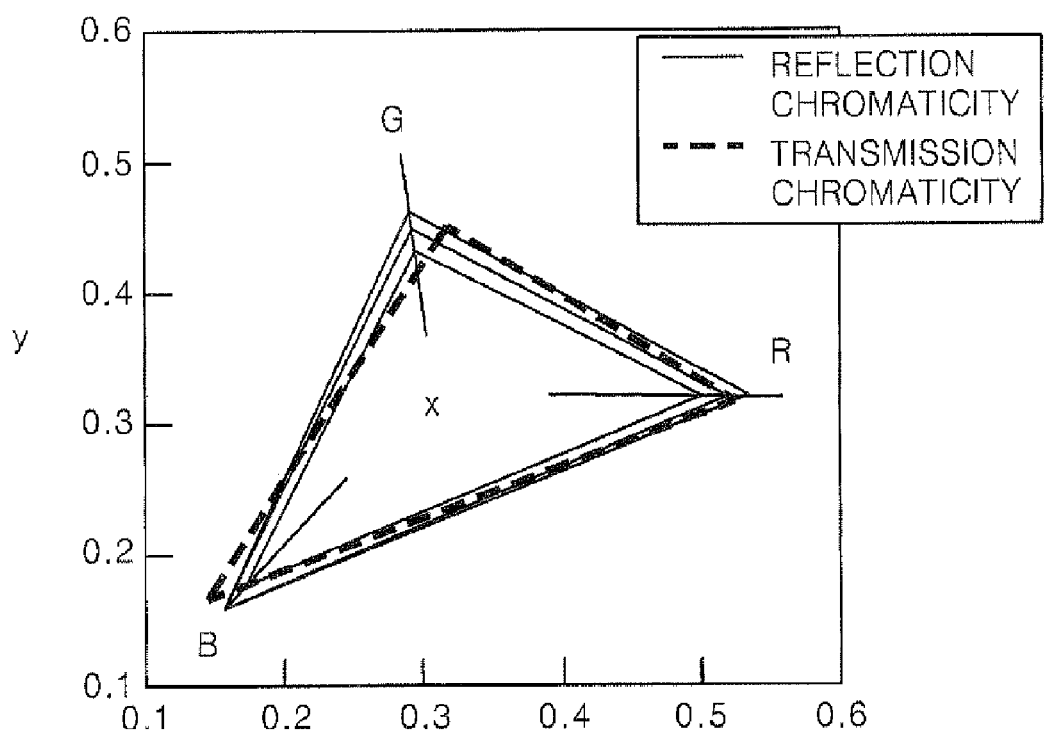
FIG. 3B is a graph illustrating variation of color coordinates based on diameters of a light hole in the display apparatus of FIG. 1.
Figure 10:
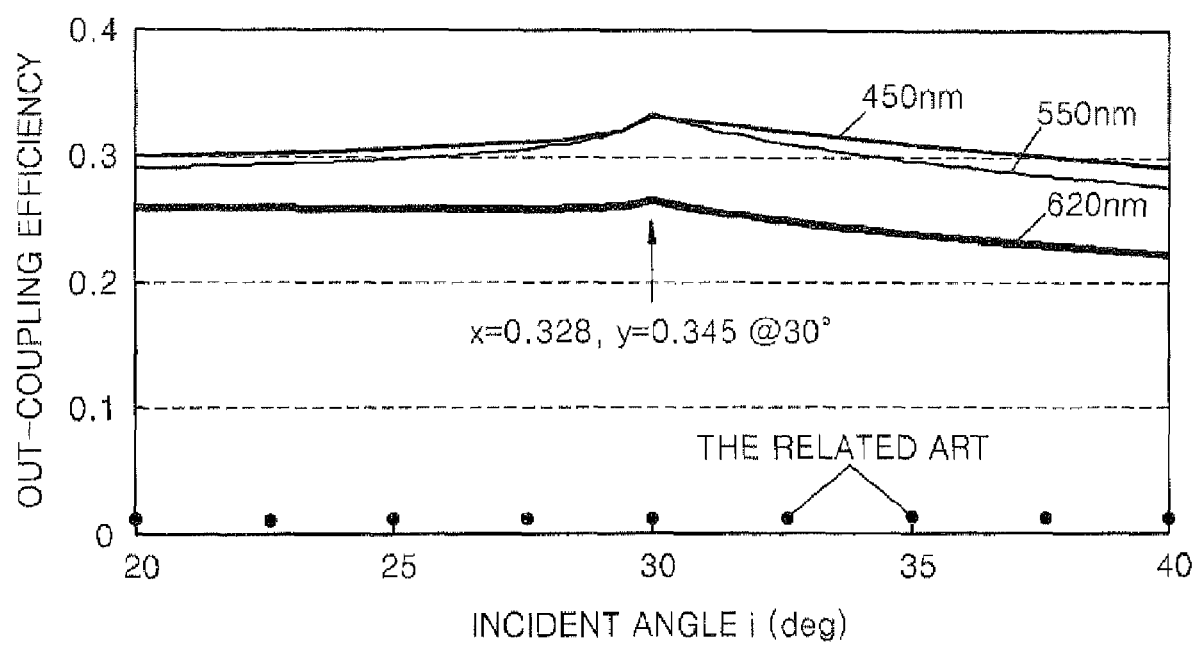
FIG. 10 is a graph illustrating out-coupling efficiencies with respect to the incident angles of the light incident onto the diffraction gratings disposed in each subpixel of the transflective display panels of FIGS. 1 and 4.

FIG. 10 is a graph illustrating out-coupling efficiencies with respect to the incident angles (i) of the light incident onto the diffraction gratings disposed in each subpixel of the transflective display panels of FIGS. 1 and 4. The simulation was performed using the light emitted at a cone angle within a range of ±10° with respect to the normal line of the liquid crystal layer. As can be seen FIG. 10, the display panel of FIG. 4 according to an exemplary embodiment of the present invention has an out-coupling efficiency of about 30%, while the related art display panel of FIG. 1 has an out-coupling efficiency of merely 2%. That is, the optical efficiency of the display panel according to an exemplary embodiment of the present invention is remarkably improved compared to the related art display panel.

Figure 11:
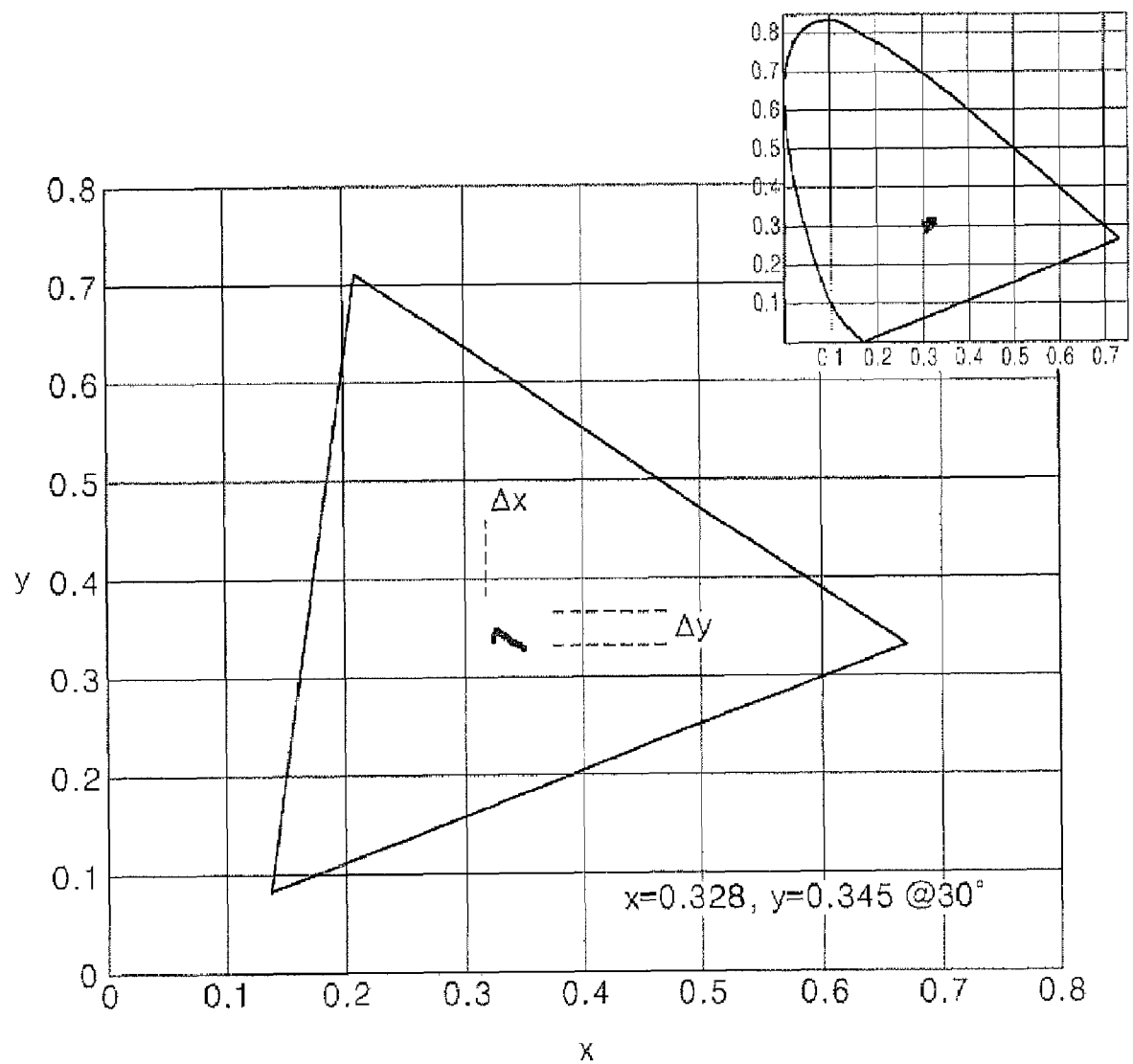
FIG. 11 is a graph illustrating color coordinates of the transflective display apparatus of FIGS. 1 and 4.

FIG. 11 is a graph illustrating the color coordinates of the display panel of an exemplary embodiment of the present invention and the color coordinates of the backlight unit. When the incident angle is 30°, x=0.328, and y=0.345, the color coordinates of the present invention have Δx=0.025 and Δy=0.018, while the color coordinates of the backlight unit have Δx=0.083 and Δy=0.068. As the values of Δx and Δy decrease, the white balance improves significantly. Therefore, the white balance of the present invention is excellent compared to the related art.

Figure 12:
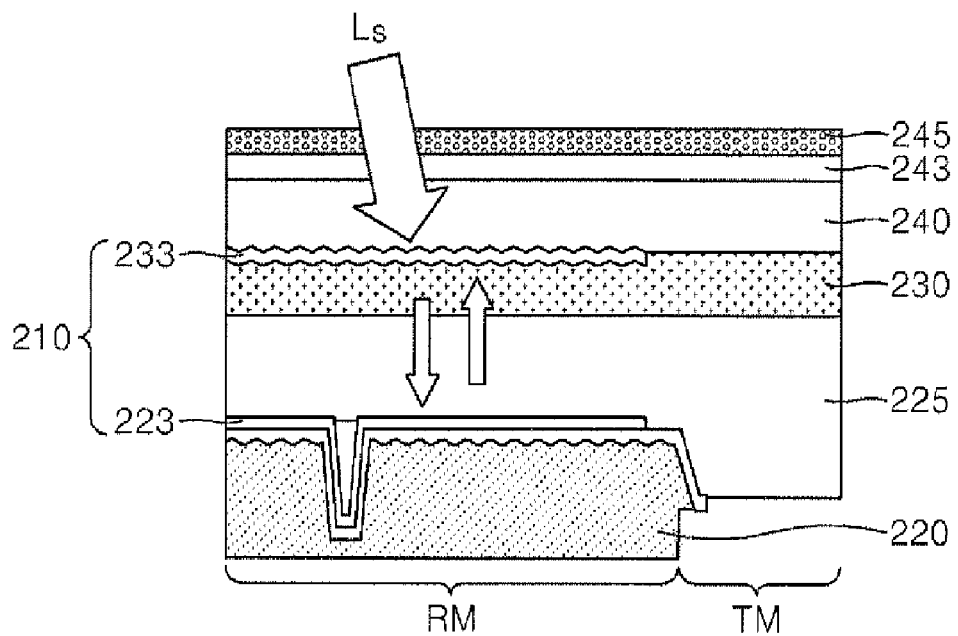
FIG. 12 is a cross-sectional view of a transflective display panel according to another exemplary embodiment of the present invention.

FIG. 12 is a cross-sectional view of a display panel according to another exemplary embodiment of the present invention. Referring to FIG. 12, the display panel includes a transflective mode region 210 having a reflection mode region RM and a transmission mode region TM. Although only one subpixel is illustrated in FIG. 12, subpixels for other colors have the same structure as the subpixel of FIG. 12. The reflection mode region RM includes a transmission type diffraction grating 233 formed above a portion of a reflection sub color filter 230, and a reflection layer 223 disposed facing the liquid crystal layer 225 under the transmission type diffraction grating 233. The transmission type diffraction grating 233 may be disposed under the sub color filter 230. A glass substrate 240, a quarter wavelength plate 243, and a linear polarization film 245 are sequentially disposed above the transmission type diffraction grating 233. The transmission type diffraction grating 233 diffracts and transmits the external light Ls, and the diffracted light passes through the sub color filter 230 and is incident on the liquid crystal layer 225. The light passing through the liquid crystal layer 225 is reflected from the reflection layer 223 and is transmitted through the sub color filter 230 and the transmission type diffraction grating 233 to the outside.

The color filter layer includes a plurality of sub color filters arranged repetitively to transmit different colors of light. The sub color filters have different transmittances based on the wavelength bands of the transmitted light. The transmission type diffraction grating 233 is arranged in a portion of each sub color filter, and the reflection layer 223 is arranged to face the transmission type diffraction grating 233. A support film 220 is disposed under the reflection layer 223. The transmission type diffraction gratings 233 in the various sub color filters may have the same patterns, regardless of the transmittance of the sub color filter. In this case, although the adjustment of the white balance is limited, a high-quality image can be obtained by adjusting the diffraction angle of the diffracted light to increase the vertical light emission.

In addition, in order to adjust the white balance, the diffraction gratings may be formed to have different patterns, such that the out-coupling efficiency of the transmission type diffraction grating is changed based on the transmittance of the sub color filter. In the same manner as the above-described exemplary embodiment, the pattern pitch and depth of the diffraction grating providing the constant out-coupling efficiency may be calculated. While the reflection type diffraction grating reflects the light once, the transmission type diffraction grating transmits the light twice. The transmission type diffraction grating 233 and the reflection layer 223 serve as the reflection type diffraction grating, which has been described in the exemplary embodiment of FIG. 4.

The external light Ls passes through the transmission type diffraction grating 233 and is reflected from the reflection layer 223. Then, the external light Ls again passes through the transmission type diffraction grating 233 and exits to the outside. In this way, the reflection mode is implemented. The internal light of the display panel apparatus passes through the transmission mode region TM where no reflection layer 223 is formed. Then, only the light within a predetermined wavelength band is transmitted through the sub color filter 230, and exits to the outside through the region where no transmission type diffraction grating 233 is formed. In this way, the transmission mode is implemented.

Figure 13:
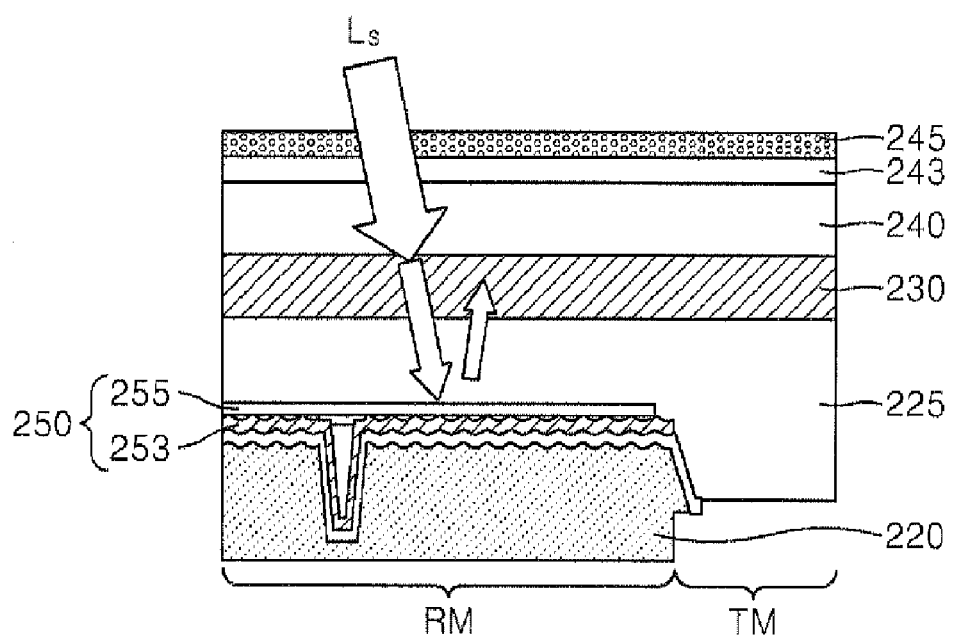
FIG. 13 is a cross-sectional view of a transflective display panel according to another exemplary embodiment of the present invention.

FIG. 13 is a cross-sectional view of a display panel according to another exemplary embodiment of the present invention. Referring to FIG. 13, the display panel includes a transflective mode region 250 with a reflection mode region RM and a transmission mode region TM. In addition, the reflection mode region RM includes a reflection type diffraction grating 253 and an incident angle adjustment film 255 disposed on the reflection type diffraction grating 253. The transmission mode region TM transmits light. In FIGS. 12 and 13, the same reference numerals are used to refer to the same elements performing substantially the same operations, and their detailed description will be omitted. The incident angle adjustment film 255 has a refractive index that may be different from the refractive index of the liquid crystal layer 225. That is, the incident angle adjustment film 255 may have a refractive index that is greater than or less than the refractive index of the liquid crystal layer 225. Due to the different refractive indices, an incident angle of light is changed when the light passing through the incident angle adjustment film 255 is incident on the reflection type diffractive grating 253. The vertical light emission of the light diffracted and reflected from the diffraction grating 255 can be increased by controlling the incident angle. The reflection type diffraction grating 253 operates substantially the same as the diffraction gratings 123a, 123b and 123c of FIG. 4.

Figure 14:
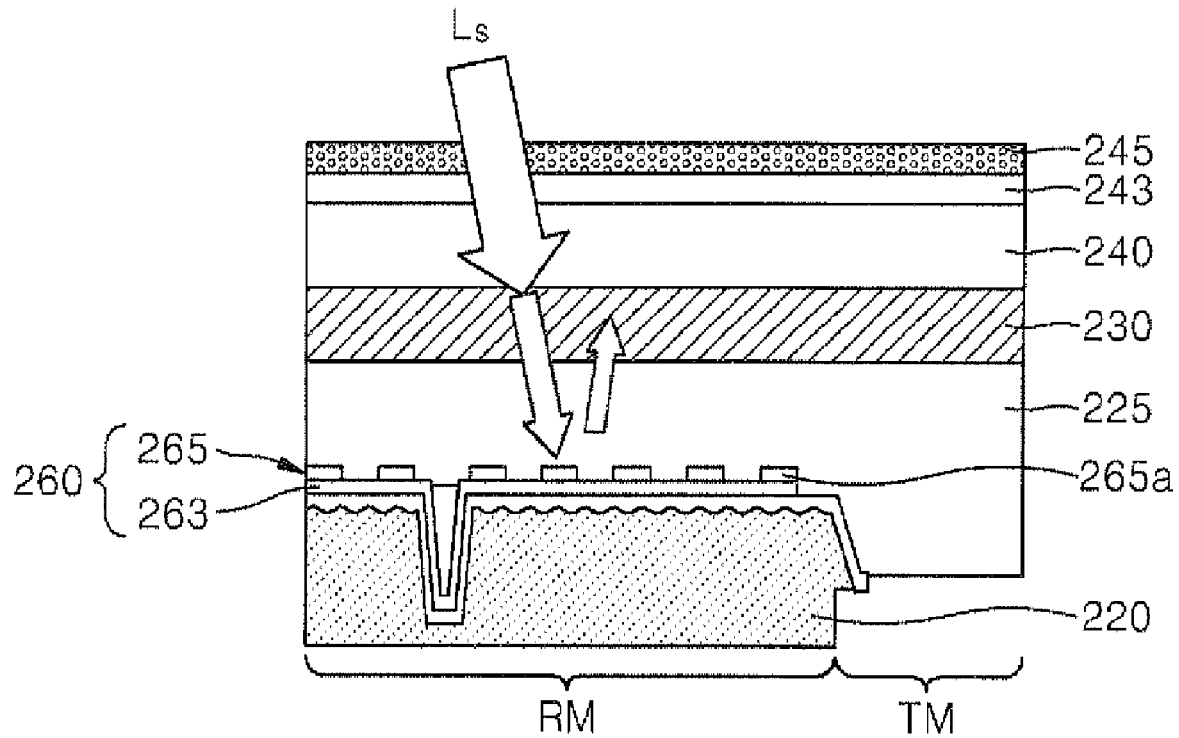
FIG. 14 is a cross-sectional view of a transflective display panel according to another exemplary embodiment of the present invention.

FIG. 14 is a cross-sectional view of a display panel according to another exemplary embodiment of the present invention. The display panel of FIG. 14 is different from the display panel of FIG. 12 in the structure of the transflective mode region. Thus, only the transflective mode region will now be described.

The transflective mode region 260 includes a reflection mode region RM and a transmission mode region TM. The reflection mode region RM includes a reflection layer 263 and an incident angle adjustment array 265. The reflection layer 263 is disposed under a liquid crystal layer 225 and the incident angle adjustment array 265a is disposed above the reflection layer 263. The incident angle adjustment array 265 includes a plurality of incident angle adjustment cells 265a arranged at constant intervals. The incident angle adjustment cells 265a have a different refractive index from the refractive index of the liquid crystal layer 225. The transmission mode region TM is formed of a transmissive material and transmits light supplied from a backlight unit. The transmission mode region TM may be formed of the same material as or a different material from the liquid crystal layer 225.

The incident angle when the light is incident onto the reflection layer 263 through an incident angle adjustment cell 265a is different from the incident angle when the light is incident between the incident angle adjustment cells 265a. Thus, in the two cases, the reflection angles in the reflection layer 263 are different from each other. Therefore, the incident angle adjustment array and the reflection layer cooperate to perform the operation of the diffraction grating.

The vertical light emission can be increased by adjusting the gap, thickness and refractive index of the incident adjustment array, thereby improving the light efficiency. Furthermore, the white balance can be adjusted by varying the gap and thickness of the incident angle adjustment array based on the subpixels.

The pattern shapes of the diffraction grating used in the exemplary embodiments of the present invention will now be described.

Figure 15B:
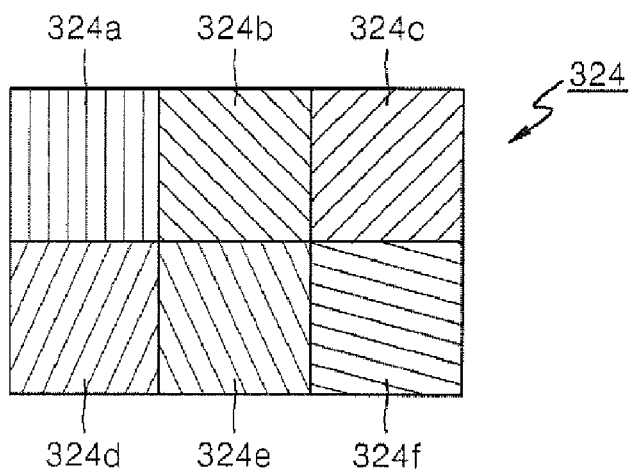

FIG. 15A illustrates a diffraction grating 323 with a constant pattern pitch. As described above with reference to FIG. 7, as the azimuth angel (ip) becomes smaller with respect to the line (ci) normal to the diffraction grating pattern, an amount of light reflected at the diffraction angle of less than 10° increases. With this in mind, the azimuth angle range of the effective light entering the viewer's eyes is changed based on the viewing direction. Therefore, when the user views a screen from a direction where there is a large amount of light incident within a large range of the azimuth angle, the image may appear unclear, because the amount of light reflected within 10° is small. That is, the image may appear clear from the front, but unclear from other directions. As illustrated in FIG. 15B, the diffraction grating 324 may be partitioned into a plurality of regions, and the diffraction patterns may be arranged in a different direction in each region.

For example, the diffraction grating 324 is partitioned into first to sixth regions 324a, 324b, 324c, 324d, 324e and 324f, and patterns are arranged in a different direction in each region. When the diffraction grating patterns are arranged in various directions, the amount of light when the user views an image in one direction decreases, but the user can view the image from various angles.

Figure 15C:
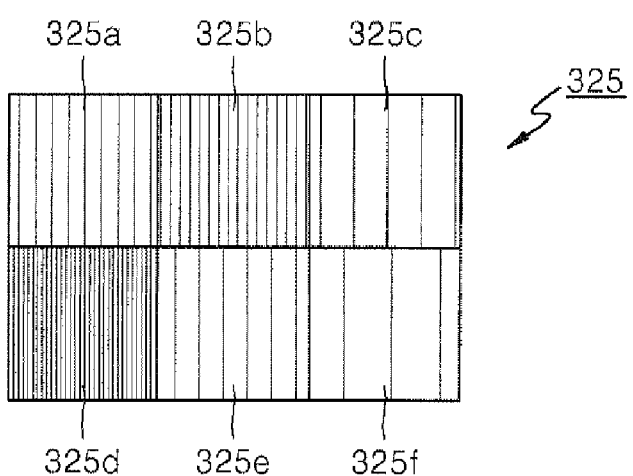

The diffraction grating 325 of FIG. 15C is partitioned into a plurality of regions 325a, 325b, 325c, 325d, 325e and 325f, and diffraction patterns with different pitches are arranged in each region. When the pitches of the diffraction patterns are different, the diffraction angles are different for light incident at the same incident angle. When the diffraction angles are different, the user can view the image from various directions.

Figure 15D:
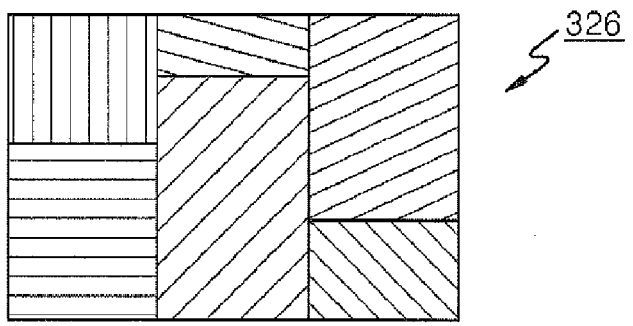

The diffraction grating 326 of FIG. 15D is partitioned into a plurality of regions. The respective regions have different areas and patterns that are arranged in different directions. Based on the direction desired by the user, the light efficiency in the desired direction can be increased by making a corresponding region wider than other regions.

Figure 16A:
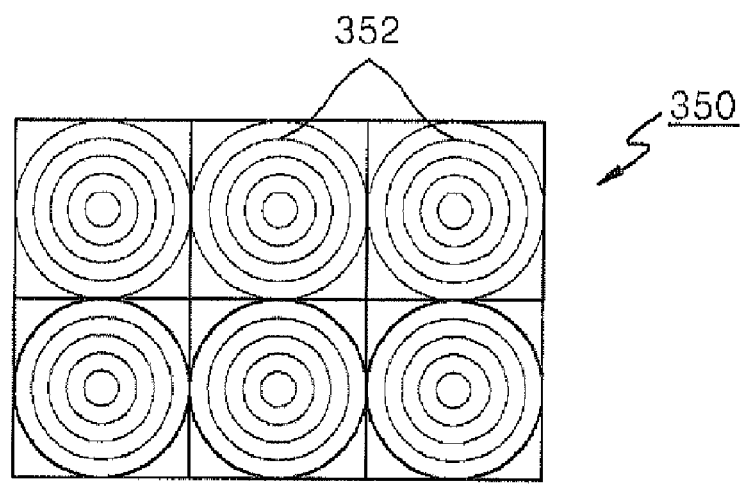
FIGS. 16A and 16B illustrate diffraction gratings with concentric patterns in the transflective display panel according to exemplary embodiments of the present invention.

The diffraction grating 350 of FIG. 16A is partitioned into a plurality of regions, and concentric diffraction patterns are formed in each region. Because the concentric diffraction patterns diffract light in the same state, regardless of the viewing directions, the user can view the image from all directions.

Figure 16B:
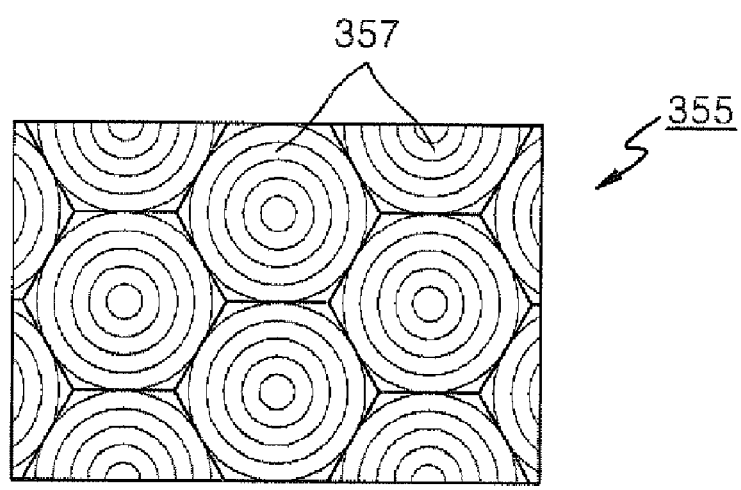

The diffraction grating 355 of FIG. 16B is partitioned in a honeycomb shape so that more concentric diffraction patterns can be arranged. As more diffraction patterns are arranged, the light efficiency is further increased.

Figure 17:
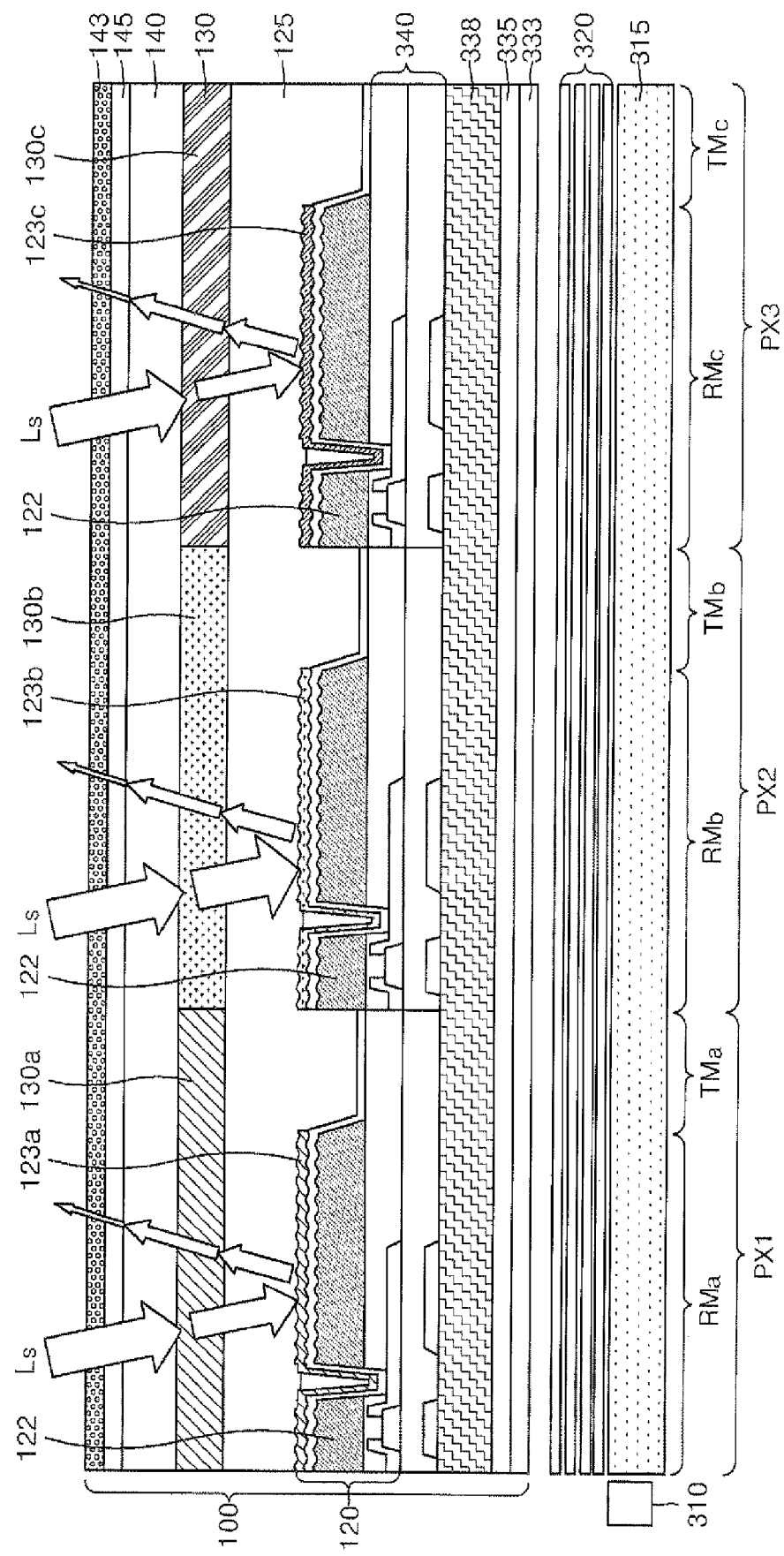
FIG. 17 is a cross-sectional view of a display apparatus according to an exemplary embodiment of the present invention.

FIG. 17 is a cross-sectional view of a display apparatus according to an exemplary embodiment of the present invention. The display apparatus displays an image using the above-described display panels. Although the display apparatus using the display panel of FIG. 4 is illustrated in FIG. 17, the above-described display panels according to exemplary embodiments of the present invention can also be used in the display apparatus.

The display apparatus includes a backlight unit which emits light and a display panel 100 which displays an image. The display panel 100 includes a plurality of pixels arranged in a matrix form. The pixels include a plurality of subpixels which output light of different colors.

The backlight unit may be implemented as a direct light type backlight unit or an edge light type backlight unit. The backlight unit illustrated in FIG. 17 is the edge light type backlight unit, and includes a light source 310 and a light guide plate 315. The light guide plate 315 guides light emitted from the light source toward the display panel 100. The edge light type backlight unit is suitable for the small-sized display apparatus, while the direct light type backlight unit is suitable for the large-sized display apparatus.

A plurality of films 320 are disposed between the light guide plate 315 and the display panel 100 to enhance the light efficiency. The plurality of films 320 may include a diffusion sheet which diffuses light, a prism sheet which corrects a light traveling path, and a brightness enhancement film (BEF) which enhances directionality by making the light passing through the prism sheet go directly toward the display panel.

The display panel 100 forms a color image by controlling the transmittance of each pixel. According to exemplary embodiments the present invention, the display panel 100 includes the transflective mode region 120, which implements the transmission mode by transmitting the light incident from the backlight unit, and implements the transmission mode by reflecting the light incident from the outside.

The transflective mode region 120 includes the reflection type diffraction gratings 123a, 123b and 123c. As described in exemplary embodiments of the present invention, the transflective mode region 120 can be configured in various ways without departing from the scope of the invention.

A linear polarization film 333, a quarter wavelength plate 335, a glass substrate 338, and a TFT layer 340 are disposed between the transflective mode region 120 and the plurality of films 320.

Because the display apparatus reflects the external light using the diffraction grating, the user can view a clear image outdoors or under bright illumination.

In addition, because the display panel includes the reflection mode region where the diffraction grating is formed, it can display a high-quality image with good white balance, even while outdoors or under bright illumination. Using the diffraction grating, the out-coupling efficiency is constantly adjusted for each of the colors. In addition, the high-efficiency light can be supplied within the viewing angle by adjusting the white balance and the diffraction angle.

Furthermore, the user can view the image from various directions by partitioning the diffraction grating into a plurality of regions and configuring the different diffraction patterns in the respective regions.

As described above, because the image is formed through the high-efficiency reflection mode region by using the external light, the portable display apparatus can be used at any location, improving its portability. Moreover, the display apparatus can be applied to large-sized billboards installed outdoors, or demonstration displays installed under bright illumination.

While the present invention has been particularly shown and described with reference to exemplary embodiments thereof, it will be understood by those of ordinary skill in the art that various changes in form and details may be made therein without departing from the spirit and scope of the present invention as defined by the following claims and their legal equivalents.

What is claimed is:

1. A display panel comprising:
    a plurality of pixels arranged in a matrix, wherein each pixel comprises a plurality of subpixels, each subpixel within a pixel outputs light of a different color, and each subpixel comprises:
    a transflective mode region which comprises a reflection mode region with a diffraction grating and a transmission mode region;
    a liquid crystal layer which adjusts a transmittance of incident light through electric control; and
    a sub color filter which transmits light within a wavelength band of the incident light,
    wherein at least one of the subpixels within the pixel comprises different patterns of diffraction gratings from other subpixels within the pixel.

2. The display panel of claim 1, wherein a pattern of the diffraction grating of a subpixel is formed based on a transmittance of the sub color filter of the subpixel.

3. The display panel of claim 1, wherein the diffraction grating of the subpixel comprises patterns which provide a constant out-coupling efficiency, wherein the out-coupling efficiency is a product of a transmittance of the sub color filter and a diffraction efficiency of the diffraction grating.

4. The display panel of claim 3, wherein the out-coupling efficiency is determined for a sub color filter which has the lowest transmittance.

5. The display panel of claim 1, wherein the diffraction grating comprises a reflection type diffraction grating.

6. The display panel of claim 1, wherein the reflection mode region comprises:
    a transmission type diffraction grating disposed at a portion of the sub color filter; and
    a reflection layer disposed at a lower portion of the liquid crystal layer.

7. The display panel of claim 1, further comprising an incident angle adjustment film disposed above the diffraction grating, wherein the incident angle adjustment film has a different refractive index from a refractive index of the liquid crystal layer.

8. The display panel of claim 1, wherein the diffraction grating is partitioned into a plurality of regions, and grating patterns are arranged in the plurality of regions in different directions.

9. The display panel of claim 1, wherein the diffraction grating is partitioned into a plurality of regions, and grating patterns of the plurality of regions have different pitches.

10. The display panel of claim 1, wherein the diffraction grating is partitioned into a plurality of regions with different areas, and grating patterns of the plurality of regions are different from one another.

11. The display panel of claim 1, wherein the diffraction grating is formed in a concentric shape.

12. The display panel of claim 1, wherein the diffraction grating is partitioned into a plurality of regions, and grating patterns are formed in a concentric shape in the plurality of regions.

13. The display panel of claim 12, wherein the plurality of regions are formed in a honeycomb shape.

14. The display panel of claim 1, wherein the sub color filter comprises a red sub color filter, a green sub color filter, and a blue sub color filter.

15. The display panel of claim 14, wherein an out-coupling efficiency of the green sub color filter and an out-coupling efficiency of the red sub color filter are equal to an out-coupling efficiency of the blue sub color filter, and the out-coupling efficiency of the blue sub color filter is a product of the transmittance of the blue sub color filter and the diffraction efficiency of the $-1^{st}$ order diffracted light of the diffraction grating of the blue sub color filter.

16. A display apparatus comprising:
    a backlight unit which emits light; and
    a display panel disposed above the backlight unit, wherein the display panel comprises a plurality of pixels arranged in a matrix, each pixel comprises a plurality of subpixels, each subpixel within a pixel outputs light of a different color, and each subpixel comprises:
    a transflective mode region which comprises a reflection mode region with a diffraction grating and a transmission mode region;
    a liquid crystal layer which adjusts a transmittance of incident light through electric control; and
    a sub color filter which transmits light within a wavelength band of the incident light,
    wherein light emitted from the backlight unit passes through the transmission mode region to form an image, and light incident from the outside is reflected from the reflection mode region to form an image, and
    wherein at least one of the subpixels within the pixel comprises different patterns of diffraction gratings from other subpixels within the pixel.

17. The display apparatus of claim 16, wherein a pattern of the diffraction grating of a subpixel is formed based on a transmittance of the sub color filter of the subpixel.

18. The display apparatus of claim 16, wherein the diffraction grating of the subpixel comprises patterns which provide a constant out-coupling efficiency, wherein the out-coupling efficiency is a product of a transmittance of the sub color filter and a diffraction efficiency of the diffraction grating.

19. The display apparatus of claim 18, wherein the out-coupling efficiency is determined for a sub color filter which has the lowest transmittance.

20. The display apparatus of claim 16, wherein the diffraction grating comprises a reflection type diffraction grating.

21. The display apparatus of claim 16, wherein the reflection mode region comprises:
   a transmission type diffraction grating disposed at a portion of the sub color filter; and
   a reflection layer disposed at a lower portion of the liquid crystal layer.

22. The display apparatus of claim 16, further comprising an incident angle adjustment film disposed above the diffraction grating, wherein the incident angle adjustment film has a different refractive index from a refractive index of the liquid crystal layer.

23. The display apparatus of claim 16, wherein the diffraction grating is partitioned into a plurality of regions, and grating patterns are arranged in the plurality of regions in different directions.

24. The display apparatus of claim 16, wherein the diffraction grating is partitioned into a plurality of regions, and grating patterns of the plurality of regions have different pitches.

25. The display apparatus of claim 16, wherein the diffraction grating is partitioned into a plurality of regions with different areas, and grating patterns of the plurality of regions are different from one another.

26. The display apparatus of claim 16, wherein the diffraction grating is formed in a concentric shape.

27. The display apparatus of claim 16, wherein the diffraction grating is partitioned into a plurality of regions, and grating patterns are formed in a concentric shape in the plurality of regions.

28. The display apparatus of claim 27, wherein the plurality of regions are formed in a honeycomb shape.

29. The display apparatus of claim 16, wherein the sub color filter comprises a red sub color filter, a green sub color filter, and a blue sub color filter.

30. The display apparatus of claim 29, wherein an out-coupling efficiency of the green sub color filter and an out-coupling efficiency of the red sub color filter are equal to an out-coupling efficiency of the blue sub color filter, and the out-coupling efficiency of the blue sub color filter is a product of the transmittance of the blue sub color filter and the diffraction efficiency of the $-1^{st}$ order diffracted light of the diffraction grating of the blue sub color filter.

* * * * *